(12) United States Patent
Piirainen

(10) Patent No.: US 7,561,648 B2
(45) Date of Patent: Jul. 14, 2009

(54) FREQUENCY ERROR ESTIMATION

(75) Inventor: Olli Piirainen, Oulu (FI)

(73) Assignee: Nokia Siemens Networks Oy, Espoo (FI)

(*) Notice: Subject to any disclaimer, the term of this patent is extended or adjusted under 35 U.S.C. 154(b) by 624 days.

(21) Appl. No.: 10/494,207

(22) PCT Filed: Oct. 30, 2002

(86) PCT No.: PCT/IB02/04589

§ 371 (c)(1),
(2), (4) Date: Apr. 29, 2004

(87) PCT Pub. No.: WO03/039091

PCT Pub. Date: May 8, 2003

(65) Prior Publication Data

US 2004/0247063 A1   Dec. 9, 2004

(30) Foreign Application Priority Data

Oct. 31, 2001   (GB) ............................... 0126130.4

(51) Int. Cl.
*H04B 1/10* (2006.01)
(52) U.S. Cl. .................. 375/350; 375/229; 375/316; 455/307
(58) Field of Classification Search ............ 375/350, 375/344, 229, 333, 230; 455/307
See application file for complete search history.

(56) References Cited

U.S. PATENT DOCUMENTS

| 5,303,263 | A | * | 4/1994 | Shoji et al. | 375/229 |
|---|---|---|---|---|---|
| 5,557,643 | A | * | 9/1996 | Kim et al. | 375/324 |
| 5,710,792 | A | * | 1/1998 | Fukawa et al. | 375/229 |
| 6,347,126 | B1 | * | 2/2002 | Nagayasu et al. | 375/344 |
| 6,389,040 | B1 | * | 5/2002 | Viswanathan | 370/480 |
| 6,597,733 | B2 | * | 7/2003 | Pollmann et al. | 375/222 |
| 6,614,840 | B1 | * | 9/2003 | Maruyama | 375/232 |
| 6,643,321 | B1 | * | 11/2003 | Genossar et al. | 375/219 |
| 6,680,967 | B1 | * | 1/2004 | Westman | 375/148 |
| 6,704,377 | B1 | * | 3/2004 | Hsuan | 375/346 |
| 6,874,096 | B1 | * | 3/2005 | Norrell et al. | 713/400 |
| 6,956,915 | B2 | * | 10/2005 | Sanchez et al. | 375/346 |
| 2001/0008543 | A1 | * | 7/2001 | Tanada | 375/232 |

FOREIGN PATENT DOCUMENTS

WO   WO 00/54431   9/2000

OTHER PUBLICATIONS

Luise et al, "An Efficient Carrier Frequency Recovery Scheme for GSM Receivers," Communication for Global Users, Communication Theory Mini Conference. Dec. 6-9, 1992, Proceedings of the Global Telecommunications Conference (GLOBECOM), vol. Mini Conference, Dec. 6, 1992, pp. 36-40, Xp000366394.

Luise et al, "Carrier Frequency Recovery in All-Digital Modems for Burst-Mode Transmissions", IEEE Transactions on Communications, IEEE Inc., vol. 43, No. 2/4, Part 2, Feb. 1, 1995, pp. 1169-1178, XP000502606.

* cited by examiner

*Primary Examiner*—Shuwang Liu
*Assistant Examiner*—David Huang
(74) *Attorney, Agent, or Firm*—Squire, Sanders & Dempsey L.L.P.

(57) ABSTRACT

There is disclosed a technique for generating an improved estimate of the frequency error in a received signal, and more particularly the application of such a technique in the equalization circuitry of a wireless network element.

13 Claims, 1 Drawing Sheet

FREQUENCY ERROR ESTIMATION

FIELD OF THE INVENTION

The present invention relates to correction of the frequency shift in a received signal of a communication system, and particularly but not exclusively in a wireless communication system.

BACKGROUND OF THE INVENTION

In known wireless communication systems, an equalizer is used in the receiver in order to equalize the received signal prior to further processing in the receiver.

However in a mobile communication system, a mobile may be moving quickly or have a carrier offset, such that the signal received in the receiver has a frequency shift.

This frequency shift needs to be removed in the receiver for the received signal to be properly processed. More particularly, the frequency shift should be removed prior to equalization of the received signal.

Existing wireless communication systems utilize techniques for removing this frequency shift. In one example, a Kalman filter based recursive estimator is used to remove the frequency shift and equalize the received signal.

The problem is to be able to receive a signal from a fast moving mobile or from a mobile where there is a carrier offset. The received signal has a frequency shift, which should be corrected.

The frequency error is usually estimated from the samples of the received samples. This estimate is typically worse when the channel quality is poor and gets better as the channel quality improves. When there is no frequency shift and the channel conditions are near the sensitivity level of a receiver, a frequency correction algorithm should not degrade the performance of the receiver. The problem of frequency error correction has become a potential problem in the case of EDGE wireless systems in particular, and as such improvements are desired.

A Maximum-Likelihood method for frequency estimation is defined in M. Luise and R. Reggiannini, "*Carrier Frequency Recovery in All-Digital Modems for Burst-Mode Transmissions, IEEE Trans. On Comm.*, February/March/April 1995. Also Australian Patent No. AU 664626 describes a system where the Doppler correction is based to change in TOA (Time of arrival).

It is an aim of the present invention to provide an improved technique for estimating and removing the frequency shift in a received signal in a communication system such as a wireless communication system.

SUMMARY OF THE INVENTION

According to the present invention there is provided a method of estimating the frequency error in a received signal, comprising: a) Receiving the signal at time t; b) Removing from said signal an estimate of the frequency error in said signal, thereby generating a frequency corrected received signal at time t; c) Equalizing said received signal, wherein the equalizing step introduces a delay of n samples, such that an equalized output is generated at time t–n; d) Generating an estimate of a first component of the frequency error in the received signal at time t–n based on the equalized output; e) Recalculating the first and second components in dependence on the frequency corrected received signal at time t; f) In dependence on the recalculated first and second values, estimating values of the first and second components of the frequency error for times t+n and t+1 respectively; and g) Wherein the first component of the estimated frequency error for time t+n is used to generate a frequency corrected signal for a signal received at time t+n.

The step of generating an estimate of the first component and recalculating the first component (steps d and e) may use the acquired decision vector:

$$\beta = \hat{\phi}(t|t-1) - \alpha(t|t-n)$$

$$\hat{\phi}(t|t) = \hat{\phi}(t|t-1) + (\delta_w^2 P^{-1}(t) + x^H(t)h^*h^T x(t))^{-1} x^H(t)h^*(y_r(t) - (1+j\beta t)h^T x(t))$$

The step of estimating a value of the first component (step h) may use the predictions:

$$\alpha(t+n|t) = \hat{\phi}(t|t)$$

$$\hat{\phi}(t+1|t) = \hat{\phi}(t|t)$$

$$P(t+1) = \left(P^{-1}(t) + \frac{1}{\delta_w^2} x^H(t)h^*h^T x(t)\right)^{-1} + E(|u(t)|^2).$$

The step of removing from said signal an estimate of the frequency error in the received signal at time t+n may use the prediction:

$$y_r(t+n) = y(t+n)e^{-j\alpha(t+n|t)(t+n)}$$

The method may further comprise generating an estimate of a second component of the error in the received signal based on an equalized output at time t–1, wherein the step of recalculating further includes recalculating the second component, and the step of the second component is estimated for time t+1 in dependence on said recalculated value.

The step of generating an estimate of the first component and recalculating the first component (steps d and e) may use the acquired decision vector:

$$\hat{\phi}(t|t) = \hat{\phi}(t|t-1) + (\delta_w^2 P^{-1}(t) + x^H(t)h^*h^T x(t))^{-1} x^H(t)h^*(y_r(t) - h^T x(t))$$

The step of generating an estimate of the first component and recalculating the first component (steps d and e) may use the acquired decision vector:

$$P^{-1}(t+1) = P^{-1}(t) + \frac{1}{\delta_w^2} x^H(t)h^*h^T x(t)$$

$$\hat{\phi}(t|t) = \hat{\phi}(t|t-1) + P(t+1)\delta_w^2 x^H(t)h^*(y_r(t) - (1+j\beta t)h^T x(t))$$

when u(t)=0.

The step of removing an estimate of the frequency error in a received signal may comprise rotating the received signal with a prediction of said error.

According to a further aspect the present invention further provides equalization circuitry comprising: rotation means for rotating a received signal at time t with a prediction of the frequency error in the received signal, thereby generating a frequency corrected received signal at time t; an equalizer having a delay of n samples and for equalizing the frequency corrected received signal at time t, and for generating an equalized received signal at time t+n; a frequency error calculator for receiving the equalized received signal at time t+n and the corrected received signal at time t, and for generating a prediction of the frequency error in a received signal received at time t+n, wherein the frequency error calculator generates an estimate of s first component of the frequency error in the received signal at time t–n based on the equalizer output, recalculates this first component in dependence on the frequency corrected received signal at time t, and in dependence on such recalculated value estimates a value of the first component for frequency error at time t+n, wherein this estimate is used by the rotation means to generate a frequency corrected signal for a signal received at time t+n.

The frequency error calculator further generates an estimate of a second component of the frequency error in the received signal based on an output of the equalizer at time t−1, and wherein said second component is recalculated and a in dependence thereon a value of the second component of the frequency error for time t+1 is estimated.

An element of a mobile communication system may include such equalization circuitry. In particular, a base transceiver station may include such circuitry, or implement the defined method.

DESCRIPTION OF PREFERRED EMBODIMENTS

Figure 1:
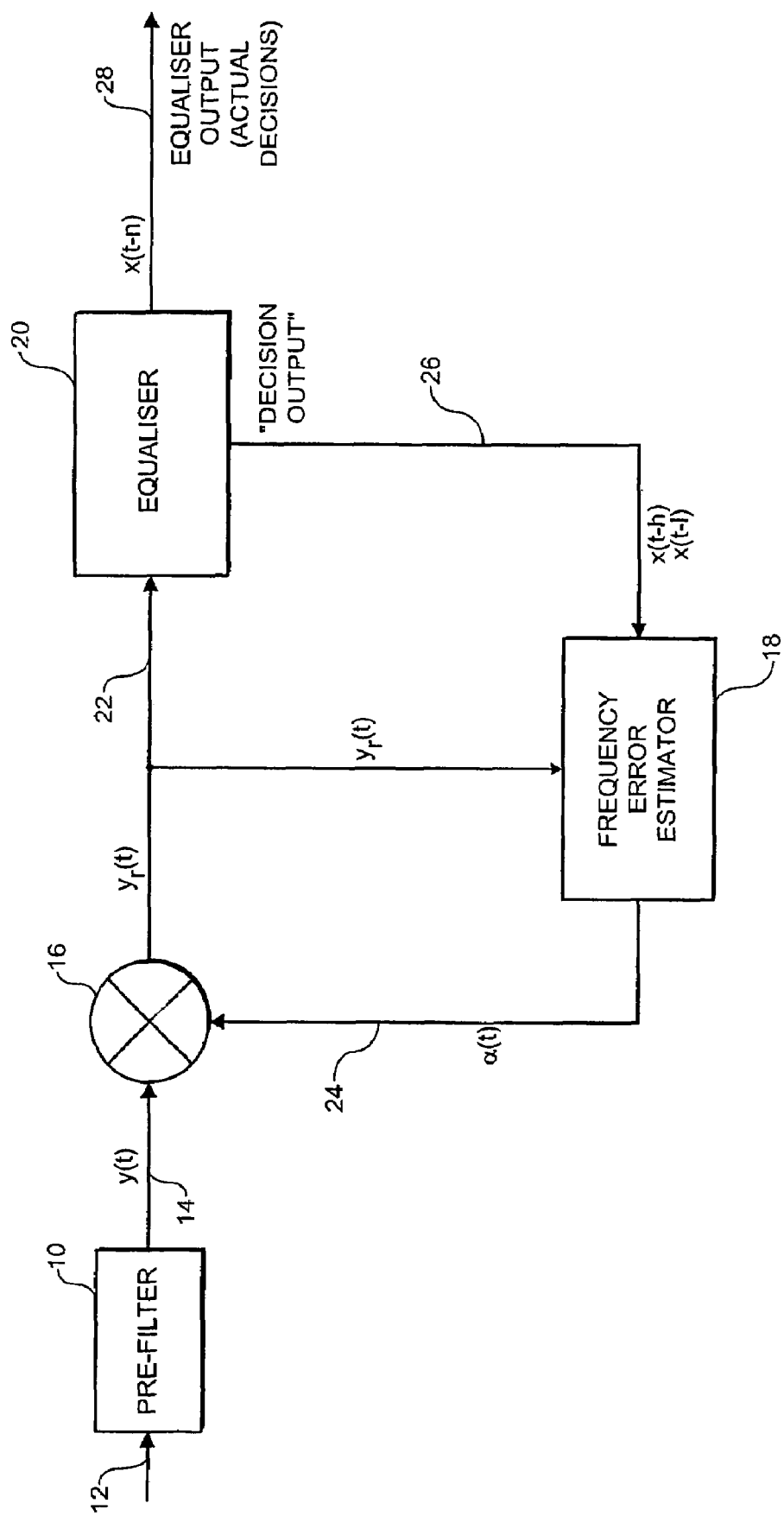
FIG. 1 illustrates a preferred embodiment of the present invention.

Referring to FIG. 1, an example implementation of the present invention will be described with reference to a particular, non-limiting example. The invention is described herein with reference to an example of a receiver in a wireless communication system, and more particularly an EDGE system. However the invention is more generally applicable, and may be utilized in any communication system in which there is a need to remove a frequency shift in an equalizer.

FIG. 1 illustrates a block diagram of a frequency equalizer in accordance with a preferred embodiment of the present invention, for an EDGE application. The block diagram includes a pre-filter 10, a mixer 16, an equalizer 20, and a frequency error estimator 18.

A received sample to be equalized at time t is provided on line 12 to the input of the pre-filter 10. The received, filtered sample is then provided on line 14 at the output of the pre-filter 10, as represented by sample y(t).

The received, filtered sample at time t, y(t), on line 14 is provided as a first input to the mixer 16. The second input to the mixer is provided, as discussed further hereinafter, by the output of the frequency error estimator 18 on line 24. The generation of the signal on line 24 by the frequency error estimator 18 is discussed further hereinbelow. As is discussed further hereinbelow, for a received sample at time t on line 14, the sample on line 24 represents the frequency error in the received sample at time (t−n), where n represents a processing delay in the equalizer.

The output of the mixer on line 22 forms the sole input to the equalizer 20 and a first input to the frequency error estimator 18. As will be further discussed hereinbelow, the output of the mixer on line 22, $y_r(t)$, represents an estimate of the received signal with any frequency error removed. However as will be apparent from the preceding paragraph, this estimate is a best estimate of the frequency error in the signal at time t based on an error estimation which was performed at time (t−n).

The equalizer 20, in accordance with conventional techniques, generates two output signals. A first output signal on line 28 represents the actual decisions made by the equalizer, and forms the output of the equalizer block. This output typically contains soft information of the received data, which soft information contains the decision about the value of the signal and in addition some quality information about the certainty of the decisions (Max-Log-MAP). This operation of the equalizer will be familiar to one skilled in the art.

In some cases, such as in a Viterbi decoder, the output on line 28 is only made available when a whole received block has been processed. In such a case a second output of the equalizer, as represented by line 26, is provided. This second output on line 26 provides 'tentative' decisions for the frequency error estimator block 18.

This second output on line 25 provides 'tentative' decisions for the frequency error estimator block 18.

Thus the second output signal of the equalizer, on line 26, forms a second input to the frequency error estimator block 18. It should be noted, however, that the example of FIG. 1 assumed an implementation such as a Viterbi decoder. If however the equalizer did not have a second output for feeding back values, then the input to the frequency error estimator 18 may be taken directly from the equalizer output 28.

The frequency error estimator generates an output on line 24 in accordance with the present invention, as further described hereinafter, in dependence on the inputs on lines 22 and 26.

The received signal on line 12, and consequently the filtered, received signal on line 14, contains a frequency shift. This received frequency shift needs to be corrected for the correct processing of the received signal.

As mentioned hereinabove, the second input of the mixer on line 24, represents the best estimate of the frequency error in the received sample y(t), and as such is the frequency error which is to be removed from the received, filtered sample at the first input of the mixer 16.

The output of the mixer 16 on line 22 represents an adjusted version of the received sample. More particularly the signal on line 22 represents the received, filtered signal on line 14, with the estimated frequency shift removed there from.

This corrected sample $y_r(t)$ on line 22 is provided to the equalizer 20. The equalizer 20 equalizes the samples on line 22 in a known manner, to provide an equalizer output on line 28 for further processing elsewhere in the receiver of which the equalizer block of FIG. 1 forms a part.

The second output of the equalizer 26 are decisions drawn as separate decisions from the actual decisions on the first output 28 of the equalizer.

Depending on the actual decisions at the first output 28, the decisions on the output 26 may actually be the same, for example if the actual decisions on line 28 are Max-Log MAP decisions. Thus the decision output gives the values of the actually transmitted data, which is the function of the equalizer block.

The frequency error estimator then processes the signals received on the respective lines 22 and 26 to generate the estimate of the frequency offset in the received signal for input to the mixer on line 24.

It should be noted that the equalizer block of FIG. 1 would function to equalize the received signals without any frequency error estimator. However, the quality of the decisions generated by such an equalizer block would be inferior.

In accordance with the present invention, the frequency error estimator 18 is adapted in order to provide improved estimates on line 24 for use in removing the frequency error from the received signal.

At time t the frequency error estimator receives the corrected received signal at time t, $y_r(t)$, and the decisions about the received signal at time (t−n) from the equalizer. The frequency error estimator then uses those values to provide an estimate of the frequency error in the received signal at time (t+n). Thus the error calculated by the frequency error estimator at time t, is used for processing the received signal received at time (t+n). Thus, in FIG. 1, there is shown that the error signal applied to the mixer 16 at the time t corresponds to an error calculated at time (t−n).

It should be noted that the equalizer block has a processing delay such that it provides the estimates relating to the samples received at a time t after a delay n. n represents the number of samples in the processing delay. Thus the frequency error estimates performed by the frequency error estimator are estimates for the future. Therefore the actual output of the equalizer 20 at the time at which the received sample y(t) is received is x(t−n).

Thus at a time t, relying purely on the completed processing of the equalizer 20, only the frequency error estimate at time t−n is available.

However, the frequency error estimator operates better if as many samples as are possibly available are used in the error estimating step. For this reason, in accordance with the present invention, the frequency error estimator additionally keeps track of all for all samples up to time t−1. As such, and referring to FIG. 1, it can be seen that the frequency error estimator receives the actual output of the equalizer 20 x(t−n), as well as the most recent 'intermediate' result, x(t−1).

The frequency error estimator operates on these two values to produce two corresponding estimates of the frequency error in the signal received at time t.

The two frequency error estimates are generated using equations as defined in the mathematical analysis given hereinbelow.

Thus, the frequency error estimate generated by the frequency error estimator has two components. The first component, $\alpha$, is the most recent error estimate based on the results available at time t−n, and the second component, $\beta$, is based on all available sample results at time t−1. It should be clear that the second component includes part processed results, as it includes in its estimates all samples from t−n to t−1.

As discussed further hereinbelow, the second component $\beta$ is used to keep track of the best possible frequency error estimate, and the first component $\alpha$ is the information that is actually output by the frequency error estimator to the mixer to correct the received signal.

Thus, in a first 'prediction' step, the frequency error estimator generates two predictions of the frequency error in the received signal: i.e. the first $\alpha$ and second $\beta$ components. As a result, at a given time t two estimates of the frequency error are available.

The frequency error estimator also receives the adjusted (or frequency corrected) sample at time t, $y_r(t)$. After receiving this sample, the frequency error estimator can recalculate the best possible frequency error estimate at time t. That is, the first $\alpha$ and second $\beta$ components of the frequency error information are corrected.

Thus, in a 'correction' step, corrected first $\alpha$ and second $\beta$ error components are generated.

After this correction step, the best error estimate for the time t is available. However, the samples related to that time have already been received and processed by the equalizer 20, and used to generate the corrected components $\alpha,\beta$ as discussed above. As such, these corrected component values cannot be used for removing the frequency error at time t.

The frequency error estimator therefore makes a further estimate of the frequency error estimate for each component. For the first component $\alpha$, the estimate is made for a time t+n, and for the second component $\beta$ the estimate is made for a time t+1. That is, estimates are made for the time at which the next results are available.

The first component $\alpha$(t+n) provides the output of the frequency error estimator, and as such provides the frequency error estimate to be removed from the received signal y(t+n). The second component $\beta$(t+1) is used for the optimality of the Kalman process within the Kalman filter, and is used only within the frequency error estimator, and not output therefrom. The use of this second component $\beta$ ensures that the frequency error estimates always use the latest data estimates from the equalizer.

The invention may be further understood with reference to the following mathematical analysis of the operation of the equalizer block shown in FIG. 1.

The problem of frequency estimation can be written as the following well-known equation:

$$y(t)=h^T x(t) e^{j\phi t}+v(t)$$

where $h^T x(t)$ is a convolution between data and channel impulse response, y is a received sample and v is a noise component. In the frequency estimation the angle $\phi$ is to be estimated.

This problem is non-linear and therefore an optimal estimator is difficult to obtain.

The above equation can be partitioned into linear and non-linear parts by setting:

$\phi=\alpha+\beta$, then $$y(t)=h^T x(t) e^{j\phi t}+v(t)=h^T x(t) e^{j(\alpha+\beta)t}+$$
$$v(t)=h^T x(t) e^{j\alpha t}(1+j\beta t)+v(t) \qquad /1/$$

A linearisation step has been used assuming $e^{j\beta t} \approx (1+j\beta t)$. Assuming white noise both sides can be multiplied by $e^{-j\alpha t}$ and now a "partly linear" model can be written as $$y(t) e^{-j\alpha t}-h^T x(t)=j\beta t h^T x(t)+w(t) \qquad /2/$$

where $\phi=\alpha+\beta$, where the frequency error $\phi$ is to be estimated. As such the components $\alpha$ and $\beta$ are to be estimated. This mathematical model defines the basis for the frequency error estimator according to the invention which is discussed above.

It should be noted that an inverse model of the above equation may be written as:

$$h^T x(t)=y(t) e^{j\phi t}+v(t),$$

and could be used to derive the state model instead of the model derived herein below.

The derivation of the state model, starting from equation (2), is now described below.

This estimator is designed to operate in the case of an equalizes, which as discussed above means that there is a decision delay (n) related to the acquired decisions. In accordance with the preferred embodiment of the present invention, the frequency error prediction is carried out for an input sample which goes to an equalizer at time (t+n), and the correction step is performed using all available information at time (t−1).

Therefore, as discussed above, there are two predictions: $\phi(t+n|t)$ and $\phi(t+1|t)$.

Also for the correction step, the sample related to the decision at time t is based on the frequency error estimate at time (t−n).

A state model of the frequency error can therefore be stated as:

$$\begin{cases} y(t)e^{-j\alpha(t|t-n)t} - h^T x(t) = j\beta(t|t-1)th^T x(t) + w(t) \\ \hat{\varphi}(t+1|t) = \hat{\varphi}(t|t) + u(t) \\ \hat{\varphi}(t|t-1) = \alpha(t|t-n) + \beta(t|t-1) \end{cases} \quad /3/$$

where it can be noted that the last equation is additional to a normal Kalman equation. It is used to define the bias between the non-linear and linear parts of equation 1. Therefore its derivation is close to an Extended Kalman Filter approach.

The term u(t) is a frequency noise term, which can be used to enhance the tracking capabilities of the frequency estimator.

The frequency error estimator itself is now discussed.

The frequency error estimator procedure is based on the predictor-corrector approach known from the Kalman filter. As the frequency error component is divided into linear and non-linear parts, an additional step is carried out to study the relation between those parts.

First the relation between $\phi(t|t-1)=\alpha(t|t-n)+\beta(t|t-1)$ is studied. It can be noted that the linear approximation $e^{j\beta t} \approx (1+j\beta t)$ is only valid when $\beta$ is small and its quality gets worse as $\beta$ gets larger. Therefore by taking the expected values of equation $E(\phi(t|t-1))=E(\alpha(t|t-n)+\beta(t|t-1))$, it can be noted that $E(\beta(t|t-1))$ is minimised when $\phi(t|t-n)=\alpha(t|t-n)$ (at time t-n.)

Using the information above a frequency error estimator (and corrector) can be derived. Note that two predictions of the frequency error are required. One may be used for rotating the samples to be used in the equalizer, and the other one may be used in the correct-on phase.

The necessary steps to be performed can therefore be defined as follows:

1. Find the frequency difference between different predictions and correct the frequency error estimate according the acquired decision vector.

$\beta = \hat{\phi}(t|t-1) - \alpha(t|t-n)$ $\hat{\phi}(t|t) = \hat{\phi}(t|t-1) + (\delta_w^2 P^{-1}(t) + x^H(t)h^*h^T x(t))^{-1} x^H(t)h^*(y_r(t)-(1+j\beta t)h^T x(t))$ 2. Create new predictions:

$\alpha(t+n|t) = \hat{\phi}(t|t)$ $\hat{\phi}(t+1|t) = \hat{\phi}(t|t)$ $P(t+1) = \left( P^{-1}(t) + \frac{1}{\delta_w^2} x^H(t)h^*h^T x(t) \right)^{-1} + E(|u(t)|^2)$ 3. Rotate the received samples with the prediction:

$y_r(t+n) = y(t+n)e^{-j\alpha(t+n|t)(t+n)}$

The $y_r$ samples are then used in the equalizer.

In the initial phase, estimates for $P(t_{initial})$ and $\phi(t_{initial})$ are needed and the samples $y_r$ are assumed to be rotated accordingly.

The simplification of the above equations is now discussed.

1. It can be noted that in case the u(t)=0, the variance of the frequency estimate for a time (t+n) can be used in the correction step and the calculation can be combined $P^{-1}(t+1) = P^{-1}(t) + \frac{1}{\delta_w^2} x^H(t)h^*h^T x(t)$ $\hat{\phi}(t|t) = \hat{\phi}(t|t-1) + P(t+1)\delta_w^2 x^H(t)h^*(y_r(t)-(1+j\beta t)h^T x(t))$ 2. If n is small, the $\beta \sim 0$ and the correction can be simplified $\hat{\phi}(t|t) = \hat{\phi}(t|t-1) + (\delta_w^2 P^{-1}(t) + x^H(t)h^*h^T x(t))^{-1} x^H(t)h^*(y_r(t)-h^T x(t))$

The invention claimed is:

1. A method, comprising:
    receiving a signal at a time t, the signal including frequency error;
    removing from said signal an estimate of the frequency error in said signal, thereby generating a frequency corrected signal representing the signal received at time t;
    equalizing said received signal, wherein the equalizing introduces a delay of n samples, such that at time t an equalized output is generated representing a signal at time t−n;
    generating an estimate of a first component of the frequency error in the signal received at time t based on the equalized output representing the signal at time t−n;
    generating an estimate of a second component of the error in the signal received at time t based on an equalized output at time t−1
    recalculating the first component in dependence on the frequency corrected received signal representing the signal at time t and recalculating the second component; and
    in dependence on the recalculated first component, estimating a first prediction of the frequency error for time t+n,
    wherein the first prediction of the estimated frequency error for time t+n is used to generate a frequency corrected signal for a signal received at time t+n and in dependence on the recalculated second component estimating a second prediction of the frequency.

2. The method of claim 1, wherein the generating said estimate of the first component and recalculating the first component use the acquired decision vector:

$\beta = \hat{\phi}(t|t-1) - \alpha(t|t-n)$ $\hat{\phi}(t|t) = \hat{\phi}(t|t-1) + (\delta_w^2 P^{-1}(t) + x^H(t)h^*h^T x(t))^{-1} x^H(t)h^*(y_r(t)-(1+j\beta t)h^T x(t))$ 3. The method of claim 1, wherein the estimating a value of the first component uses the predictions:

$\alpha(t+n|t) = \hat{\phi}(t|t)$ $\hat{\phi}(t+1|t) = \hat{\phi}(t|t)$ $P(t+1) = \left( P^{-1}(t) + \frac{1}{\delta_w^2} x^H(t)h^*h^T x(t) \right)^{-1} + E(|u(t)|^2)$ 4. The method of claim 1, wherein the removing from said signal said estimate of the frequency error in the received signal at time t+n uses the prediction:

$y_r(t+n) = y(t+n)e^{-j\alpha(t+n|t)(t+n)}$

5. The method of claim 1, wherein the generating said estimate of the first component and recalculating the first component use the acquired decision vector:

$$\hat{\phi}(t|t) = \hat{\phi}(t|t-1) + (\delta_w{}^2 P^{-1}(t) + x^H(t)h^*h^Tx(t))^{-1}x^H(t)h^*(y_r(t) - h^Tx(t))$$

6. The method of claim 5, wherein the generating said estimate of the first component and recalculating the first component use the acquired decision vector:

$$P^{-1}(t+1) = P^{-1}(t) + \frac{1}{\delta_w^2} x^H(t) h^* h^T x(t)$$

$$\hat{\phi}(t|t) = \hat{\phi}(t|t-1) + P(t+1)\delta_w{}^2 x^H(t)h^*(y_r(t) - (1+j\beta t)h^T x(t))$$

when u(t)=0.

7. The method of claim 1, wherein the removing the estimate of the frequency error in a received signal comprises rotating the received signal with a prediction of said error.

8. Equalization circuitry, comprising:
rotation means for rotating a signal received at a time t with a prediction of the frequency error in the received signal and generating a frequency corrected signal representing the signal received at time t;
equalizer means having a delay of n samples and for equalizing the frequency corrected signal representing the signal received at time t, and for generating an equalized output at time t+n representing the signal at time t;
frequency error calculator means for receiving the equalized output at time t+n and the frequency corrected signal representing the signal received at time t, and for generating a prediction of the frequency error in the signal at time t+n, wherein the frequency error calculator means is configured to generate an estimate of a first component of the frequency error in the signal received at time t based on the equalizer means output representing the signal at time t−n, to recalculate this first component in dependence on the frequency corrected signal representing the signal at time t, and in dependence on such recalculated component to estimate a value of the first component for the frequency error at time t+n, wherein this estimate is used by the rotation means to generate a frequency corrected signal for the signal received at time t+n, wherein the frequency error calculator means is further configured to generate an estimate of a second component of the frequency error in the received signal based on an output of the equalizer means at time t−1, and wherein said second component is recalculated and, in dependence thereon, a value of the second component of the frequency error for time t+1 is estimated.

9. An element of a mobile communication system comprising:
equalization circuitry comprising
rotation means for rotating a signal received at a time t with a prediction of the frequency error in the received signal and generating a frequency corrected signal representing the signal received at time t:
equalizer means having a delay of n samples and for equalizing the frequency corrected signal representing the signal received at time t, and for generating an equalized output at time t+n representing the signal at time t:
frequency error calculator means for receiving the equalized output at time t+n and the frequency corrected signal representing the signal received at time t, and for generating a prediction of the frequency error in the signal at time t+n,
wherein the frequency error calculator means is configured to generate an estimate of a first component of the frequency error in the signal received at time t based on the equalizer means output representing the signal at time t−n, to recalculate this first component in dependence on the frequency corrected signal representing the signal at time t, and in dependence on such recalculated component to estimate a value of the first component for the frequency error at time t+n,
wherein this estimate is used by the rotation means to generate a frequency corrected signal for the signal received at time t+n, wherein the frequency error calculator means is further configured to generate an estimate of a second component of the frequency error in the received signal based on an output of the equalizer means at time t−1, and
wherein said second component is recalculated and, in dependence thereon, a value of the second component of the frequency error for time t+1 is estimated.

10. A base transceiver station of a mobile communication system comprising:
equalization circuitry comprising
rotation means for rotating a signal received at a time t with a prediction of the frequency error in the received signal and generating a frequency corrected signal representing the signal received at time t:
equalizer means having a delay of n samples and for equalizing the frequency corrected signal representing the signal received at time t, and for generating an equalized output at time t+n representing the signal at time t;
frequency error calculator means for receiving the equalized output at time t+n and the frequency corrected signal representing the signal received at time t, and for generating a prediction of the frequency error in the signal at time t+n,
wherein the frequency error calculator means is configured to generate an estimate of a first component of the frequency error in the signal received at time t based on the equalizer means output representing the signal at time t−n, to recalculate this first component in dependence on the frequency corrected signal representing the signal at time t, and in dependence on such recalculated component to estimate a value of the first component for the frequency error at time t+n,
wherein this estimate is used by the rotation means to generate a frequency corrected signal for the signal received at time t+n, wherein the frequency error calculator means is further configured to generate an estimate of a second component of the frequency error in the received signal based on an output of the equalizer means at time t−1, and
wherein said second component is recalculated and, in dependence thereon, a value of the second component of the frequency error for time t+1 is estimated.

11. Equalization circuitry, comprising:
a rotation unit configured to rotate a signal received at a time t with a prediction of the frequency error in the received signal and to generate a frequency corrected signal representing the signal received at time t;
an equalizer having a delay of n samples and configured to equalize the frequency corrected signal representing the signal received at time t, and to generate an equalized output at time t+n representing the signal at time t;
frequency error calculator configured to receive the equalized output at time t+n and the frequency corrected signal representing the signal received at time t, and to generate a prediction of the frequency error in the signal at time t+n, wherein the frequency error calculator is configured to generate an estimate of a first component of the frequency error in the signal received at time t based on the equalizer output representing the signal at time t−n, to recalculate this first component in dependence on the frequency corrected signal representing the signal at time t, and in dependence on such recalculated component to estimate a value of the first component for the frequency error at time t+n, wherein this estimate is used by the rotation unit to generate a frequency corrected signal for the signal received at time t+n, wherein the frequency error calculator is further configured to generate an estimate of a second component of the frequency error in the received signal based on an output of the equalizer at time t−1, and wherein said second component is recalculated and, in dependence thereon, a value of the second component of the frequency error for time t+1 is estimated.

12. An element of a mobile communication system comprising:

equalization circuitry comprising a rotation unit configured to rotate a signal received at a time t with a prediction of the frequency error in the received signal and to generate a frequency corrected signal representing the signal received at time t:

an equalizer having a delay of n samples and configured to equalize the frequency corrected signal representing the signal received at time t, and to generate an equalized output at time t+n representing the signal at time t;;

frequency error calculator configured to receive the equalized output at time t+n and the frequency corrected signal representing the signal received at time t, and to generate a prediction of the frequency error in the signal at time t+n, wherein the frequency error calculator is configured to generate an estimate of a first component of the frequency error in the signal received at time t based on the equalizer output representing the signal at time t−n, to recalculate this first component in dependence on the frequency corrected signal representing the signal at time t, and in dependence on such recalculated component to estimate a value of the first component for the frequency error at time t+n, wherein this estimate is used by the rotation unit to generate a frequency corrected signal for the signal received at time t+n, wherein the frequency error calculator is further configured to generate an estimate of a second component of the frequency error in the received signal based on an output of the equalizer at time t−1, and wherein said second component is recalculated and, in dependence thereon, a value of the second component of the frequency error for time t+1 is estimated.

13. A base transceiver station of a mobile communication system comprising:

equalization circuitry comprising a rotation unit configured to rotate a signal received at a time t with a prediction of the frequency error in the received signal and to generate a frequency corrected signal representing the signal received at time t;

an equalizer having a delay of n samples and configured to equalize the frequency corrected signal representing the signal received at time t, and to generate an equalized output at time t+n representing the signal at time t;

frequency error calculator configured to receive the equalized output at time t+n and the frequency corrected signal representing the signal received at time t, and to generate a prediction of the frequency error in the signal at time t+n, wherein the frequency error calculator is configured to generate an estimate of a first component of the frequency error in the signal received at time t based on the equalizer output representing the signal at time t−n, to recalculate this first component in dependence on the frequency corrected signal representing the signal at time t, and in dependence on such recalculated component to estimate a value of the first component for the frequency error at time t+n, wherein this estimate is used by the rotation unit to generate a frequency corrected signal for the signal received at time t+n, wherein the frequency error calculator is further configured to generate an estimate of a second component of the frequency error in the received signal based on an output of the equalizer at time t−1, and wherein said second component is recalculated and, in dependence thereon, a value of the second component of the frequency error for time t+1 is estimated.

* * * * *